(12) United States Patent
Barker et al.

(10) Patent No.: US 8,790,782 B2
(45) Date of Patent: Jul. 29, 2014

(54) METHOD FOR MAKING GLASS FRIT POWDERS USING AEROSOL DECOMPOSITION

(75) Inventors: Michael F. Barker, Tokyo (JP); John James Barnes, Hockessin (DE); Rob Cockerill, Cary, NC (US); Howard David Glicksman, Durham, NC (US); Warren Harrell, Raleigh, NC (US); James J. Krajewski, Somerville, NJ (US); Michele L. Ostraat, Jamison, PA (US); Jay Scott Schickling, Hendersonville, TN (US); Barry Edward Taylor, Wake Forest, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1090 days.

(21) Appl. No.: 12/166,457

(22) Filed: Jul. 2, 2008

(65) Prior Publication Data

US 2010/0004110 A1    Jan. 7, 2010

(51) Int. Cl.
| | |
|---|---|
| *B29D 22/00* | (2006.01) |
| *B28B 11/00* | (2006.01) |
| *A47G 19/22* | (2006.01) |
| *B29C 47/00* | (2006.01) |
| *B32B 1/08* | (2006.01) |
| *B32B 17/06* | (2006.01) |
| *B32B 9/00* | (2006.01) |
| *B32B 9/04* | (2006.01) |
| *B32B 13/04* | (2006.01) |
| *B32B 19/00* | (2006.01) |

(52) U.S. Cl.
USPC ........ 428/428; 428/34.1; 428/34.4; 428/34.6; 428/36.9; 428/36.91; 428/426; 428/446; 428/448; 428/701; 428/702

(58) Field of Classification Search
USPC .......... 428/34.1, 34.4, 34.6, 36.9, 36.91, 426, 428/428, 446, 448, 701, 702
See application file for complete search history.

(56) References Cited

U.S. PATENT DOCUMENTS

| | | | |
|---|---|---|---|
| 4,904,515 | A | 2/1990 | Mtsuo et al. |
| 6,338,809 | B1 | 1/2002 | Hampden-Smith et al. |
| 6,360,562 | B1 | 3/2002 | Kodas et al. |
| 6,866,929 | B2 | 3/2005 | Kodas et al. |
| 2008/0035682 | A1 | 2/2008 | Coffey et al. |

FOREIGN PATENT DOCUMENTS

| | | | |
|---|---|---|---|
| GB | 2121028 A | 12/1983 | |
| JP | 56078117 A | 6/1981 | |
| JP | 62241542 A | 10/1987 | |
| JP | 08310836 A | 11/1996 | |
| JP | 2003246643 A | 9/2003 | |
| JP | 2007246311 A | 9/2007 | |
| WO | WO/2007/091834 | * 8/2007 | ............ C01B 33/027 |

OTHER PUBLICATIONS

Hong et al., "Preparation of Bi2O3—B2O3—ZnO—BaO—SiO2 glass powders with spherical shape by spray pyrolysis", Journal of Alloys and Compounds, vol. 437, 2007, pp. 215-219.*
Certified English Translation of JP-62-241542 to Nippon Steel Corp. et al., Oct. 1987.*
International Search Report for International Application No. PCT/US2009/049469 Dated October 26, 2009.
Kingery, W. D., Introduction to Ceramics, 1960, Title Page, pp. 3, 5-8, John Wiley & Sons, Inc.

* cited by examiner

*Primary Examiner* — Jonathan Langman

(57) ABSTRACT

The invention relates to a corrosion resistant reactor tube, method for providing a passivating or corrosion resistant coating to the inside of the reactor tube, and a method of making high bismuth glass powders using the corrosion resistant reactor tube.

5 Claims, No Drawings

METHOD FOR MAKING GLASS FRIT POWDERS USING AEROSOL DECOMPOSITION

FIELD OF INVENTION

The invention relates to a corrosion resistant reactor tube, method for providing a passivating or corrosion resistant coating to the inside of the reactor tube, and a method of making high bismuth glass powders using the corrosion resistant reactor tube.

TECHNICAL BACKGROUND OF THE INVENTION

Many product applications require glass powders that have one or more of the following properties: high purity, controlled chemistry, spherical morphology, small average size, narrow size distribution, and little or no agglomeration. Examples of glass powder applications requiring such characteristics include, but are not limited to, thick film pastes used for fabricating electronic devices. Thick film pastes are mixtures of the powders in an organic vehicle, wherein the organic vehicle is removed after application of the paste to a substrate by firing the composition at elevated temperatures.

Aerosol decomposition of an atomized liquid spray of precursor solution is a useful method for producing generally spherical glass particles. In such a process, a precursor solution containing the elements desired in the final glass is atomized to produce an aerosol. The aerosol particles are then transported through a reaction tube where the solvent is removed and the aerosol particles are heated to a temperature sufficiently high to convert the precursor compounds to the product glass particles. At these high temperatures a suitable material of construction reactor tube needs to be used.

There is need for improved aerosol methods useful for the production of glass powders. There is also a need for glasses with improved properties, and methods of making glasses. In addition, there is a need for improved devices useful in the methods of making glasses by aerosol methods.

SUMMARY OF THE INVENTION

The invention is therefore directed to a ceramic or glass-ceramic reactor tube that is resistant to corrosion by bismuth containing, and bismuth and alkali containing, compounds at elevated temperatures in an oxidizing environment, a method for forming a protective coating consisting of a silicon dioxide layer and a bismuth silicate layer making the resultant tube corrosion resistant under the conditions of the aerosol reaction, and the use of this tube to make high bismuth containing, and bismuth and alkali containing glasses.

DETAILED DESCRIPTION OF THE INVENTION

Chemical reactions which are used in the manufacture of large volume industrial processes must take many factors into account in order to maintain a robust, high quality, high throughput and cost effective method to produce materials. One such chemical reaction which is the subject of the present invention is the manufacture of glass particles, where the final glass powder may contain a relatively large concentration of bismuth ions, as well as other elements, like alkali ions such as lithium, sodium, and/or potassium, in order to achieve the desired glass performance and properties.

The invention relates to improved aerosol methods useful for the production of glass powders. In an embodiment, the glass powders may contain a relatively large concentration of bismuth ions. Further, the invention relates to glasses with improved properties, and methods of making glasses. In addition, the invention relates to improved devices useful in the methods of making glasses by aerosol methods.

In the methods of making glasses by aerosol methods, glass materials may be aerosolized in a reaction tube. In the process of aerosolizing glass materials, it was recognized that the reaction tubes corroded in the presence of certain glass materials, such as those containing high concentrations of bismuth. Accordingly, it was recognized that there was a need for improved methods of making glasses by aerosol methods, improved devices for use in aerosol methods, and a need for glasses made by aerosol methods using the improved devices.

Coated Tubes

In an embodiment of the present invention, coated tubes are provided. In an aspect of this embodiment, the coated tubes may be reaction tubes, and may be used in the methods of making glasses by aerosol methods. The coated tubes have the physical and chemical properties suitable for the high temperature process (e.g., 500-1300° C.). In an embodiment, the tubes may have the ability to be used in continuous operation, withstand thermal cycles between ambient and the maximum temperature of operation, and have effective service lives of six months or more. In an embodiment, the coated tubes may be corrosion resistant to the environment of the aerosols. The resistance to corrosion may prevent the contamination of the glass powders being made with tube materials. Further, the resistance to corrosion may prevent the failure of the tubes during the manufacturing process.

In an embodiment, the starting tubes may be made of one or more of various materials recognized by one of skill in the art, including ceramic, glass-ceramic, glass, and metal. In an embodiment, the tubes may be selected from the group consisting of: Hexoloy® SiC and Reaction Bonded SiC tubes and coupons. In an embodiment, the starting tube may include one or more of the following materials: silicon carbide, reaction bonded silicon carbide, alpha-sintered silicon carbide (e.g. Hexoloy® SiC), and silicon nitride. In an embodiment, the starting tube may include reaction bonded silicon carbide.

U.S. Pat. No. 6,338,809 Hampden-Smith et al. and U.S. Pat. No. 6,866,929 by Kodas et al., which are hereby incorporated by reference herein, describe reaction tubes made of ceramic materials such as mullite, fused silica, and alumina or metallic tubes.

An embodiment relates to a coated ceramic or glass-ceramic reactor tube that is resistant to corrosion by bismuth containing compounds, and bismuth and alkali containing compounds at elevated temperatures in an oxidizing atmosphere, wherein the coating on the inside of the tube includes a silicon dioxide layer and a bismuth silicate layer.

The term "corrosion" as used herein is defined as an unwanted or undesirable chemical or physical change in the reactor tube. An example of corrosion is the dissolution or penetration of the reactor tube by the aerosol precursor or any chemical or physical attack on the reactor tube which may lead to the reactor tube's failure or may lead to contamination of the glass powder being made and thereby ending the useful life of the reactor tube's service in the manufacture of the glass powder. Further, any mechanism by which the reactor tube's inherent durability or robustness to the aerosol at elevated temperature, or any mechanism by which the normal (inherent) life of the reactor tube may be significantly extended is defined as "corrosion resistance". Long service life and little evidence of chemical or physical damage to the reactor tube, leading to destruction of the tube and/or termination of the reactor tube's useful service life are considered key attributes of the reactor tube's utility in the context of the present invention.

The definition of ceramics as used in the present invention is taken from "Introduction To Ceramics" by W. D. Kingery, H. K. Bowen, and D. R. Uhimann: "ceramics [are defined] as the art and science of making and using solid articles which have as their essential component, and are composed in large part of, inorganic nonmetallic materials. Some examples of ceramic materials might be alumina, crystoballite, alpha-quartz, mullite, kyanite, silicon carbide, silicon nitride, and yttrium zirconium titanate".

The various forms of reactor tubes as they are intended to be used in the present invention may be manufactured by processes recognized by one of skill in the art. The specific geometries and tolerances required by the aerosol process may be considered in the selected of the manufacturing process. Exemplary manufacturing processes used for the tube manufacture include, but are not limited to slip casting, molding, or extruding.

Metals, metal alloys, metal mixtures such as steel, stainless steel, platinum and alloys thereof, Inconel® (a registered trademark of Special Metals Corporation that refers to a family of austenitic nickel-based superalloys), tungsten, molybdenum, and tungsten-molybdenum alloys, are often used as reactor vessels or materials of construction for reactor tubes for reactions under ambient conditions but more particularly, for reactions at elevated temperature and/or pressure and in corrosive environments.

Alpha-sintered Silicon Carbide (or SiC) is also known as pressureless sintered SiC. This material is typically fully dense, with less than one percent porosity in the final fired shape. The material almost has a glassy appearance because of its low porosity. Shapes made from this material are typically isostatically pressed or extruded, where fine SiC powder is compacted into a net or near net shape. Some green state machining may then be performed to achieve a pre-fired net shape. The piece may then be fired at high temperatures in excess of 1500° C. to complete the sintering process, with the piece shrinking in excess of fifteen (15) percent in size. Alpha-sintered SiC is a very strong material, but has very low fracture toughness. If a crack is induced in the material, failure is typically catastrophic. Also, there are size limitations for this material because of its processing technique. Tubes of this material larger than four inches in diameter are very difficult to fabricate, and long lengths over 88 inches are not currently possible.

Alpha-sintered SiC is commonly used as thermocouple protection tubes, kiln furniture, seals, heat exchanger tubing, and rollers. Because of its non-oxide chemistry, oxidation of the material is of concern over 1500° C. Below this temperature alpha-sintered SiC maintains a protective oxide layer on its surface that passivates further oxidation.

Reaction bonded SiC is a fully densified material that is comprised of a skeletal network of SiC grains, with interstitial space in the body being filled by metallic Silicon. The material is produced by either pressing or slip casting ceramic powders into a net shape. This material is then fired in the presence of carbon and silicon, which infiltrate the porous body. Reactions between the carbon and silicon result in SiC necks joining the pre-formed SiC grains together. Any additional silicon remains in the pores of the material to make it essentially pore free. There is very little dimensional change during this reaction bonding step.

Reaction bonded SiC is typically not as strong as alpha-sintered SiC, but has much higher fracture toughness because of the silicon phase. RBSiC can be manufactured into quite large shapes, with limitations on size primarily due to handling issues with the weak green bodies, and with furnace size. RBSiC is typically used as kiln furniture, heat exchanger tubes, wear resistant protective shapes, and armor. Like alpha-sintered SiC, it forms a passivating oxide layer which protects it from further oxidation at elevated temperatures. RBSiC typically is not used at temperatures above 1370° C. because of softening of the silicon phase.

Coating for Tubes

In an embodiment of the invention, coated tubes may include a coating on the inside of the reactor tube. The coating may include one or more components selected from the group consisting of: silicon dioxide, bismuth silicate, and mixtures thereof. The coating may include one or more layers. The one or more layers may include one or more layers selected from the group consisting of: a silicon dioxide layer, a bismuth silicate layer, and mixtures thereof.

In an embodiment, the silicon dioxide coating may include one or more crystalline forms selected from the group consisting of: cristoballite, quartz, and tridymite. In an embodiment, the bismuth silicate coating may include one or more components selected from the group consisting of: crystalline $Bi_4Si_3O_{12}$ and an amorphous material including the components $Bi_2O_3$ and $SiO_2$. In a further aspect, the amorphous material may include the approximate composition $2Bi_2O_3.3SiO_2$.

The coated tube may be resistant to corrosion in the presence of bismuth containing compositions, alkali containing compositions, and mixtures thereof. In an aspect of this embodiment, the coated tube may be resistant to corrosion in the presence of an elevated temperature (500° C.-1300° C.) in an oxidizing environment.

In an embodiment, the coatings formed on the tubes or coupons may include an inner layer of crystalline silica and an outer layer including crystalline and non-crystalline bismuth silicate. In an embodiment, the crystalline silica layer may be a thin (approximately 30 micron) layer, may include columnar grains, and may be adhered to the silicon carbide substrate.

In an embodiment, the bismuth silicate layer may be a thicker layer than the crystalline silica layer; the bismuth silicate layer may be mostly glassy, and may contain some crystalline domains. The layer may be bismuth-rich, with the Bi/Si ratio>1, and, in an embodiment, in the range of approximately 2.7-4.0, as measured using a scanning electron microscope equipped with an energy dispersive spectroscopy analyzer. Within the glassy layer there may also be some crystalline silica domains. The above coatings were evaluated both on Hexoloy® SiC and on Reaction Bonded SiC tubes.

Method of Making a Coated Tube

In an embodiment, the coating may be formed by a variety of methods. These methods are recognized by one of ordinary skill in the art and include, for example, plasma spray, thermal spray, pre-treating the tube to form the corrosion resistant layers, and forming the corrosion resistant layers during the process for making bismuth containing, and bismuth and alkali containing glass powders. The coating may also be formed using a dispersion of the bismuth silicate glass power in a suitable organic medium, coating the inside of the tube with this dispersed material, drying the dispersion to remove solvents, and then firing the coated tube at a suitable temperature to fuse the bismuth silicate layer. In an embodiment, temperatures of 500° C.-1300° C. may be used for the formation of the bismuth silicate layer. In an embodiment, the temperature is 700° C.-1000° C.

Method of Making a Glass Powder Using Coated Tubes

An embodiment of the invention relates to methods of making a glass powder using coated tubes described herein. An aspect of this embodiment relates to methods of making bismuth containing glass powders, alkali containing glass powders, or mixtures thereof using coated tubes described herein. In an embodiment, this method employs an aerosol decomposition process. The aerosolization process is described in detail in U.S. Pat. No. 6,360,562 Kodas et al. which is hereby incorporated by reference herein. In an aspect of this embodiment, the aerosol decomposition process utilizing the coated tubes to make high bismuth containing and/or alkali containing glass powders may take longer than about 48 hours. In an embodiment, the process may be conducted in an oxidizing atmosphere. In an aspect of this embodiment, the oxidizing atmosphere may be air.

In an embodiment, the temperature range over which the corrosion resistant reactor tube can be used is quite wide and ranges from 500° C.-1300° C. In an embodiment, the temperature is 700° C.-1000° C.

Glasses

An embodiment of the present invention relates to methods of making glass powders using aerosol decomposition. A further embodiment of the invention relates to glasses made by the methods described herein.

In an embodiment, complex glasses may be made using the methods described herein. As used herein, complex glasses are those that include at least one structural forming oxide (e.g. $SiO_2$) and at least one additional oxide (e.g. $B_2O_3$). Complex glasses include binary, ternary, or quaternary glasses, as well as glasses including more than four components.

As used herein, glass powders or glass particles are inorganic materials that are predominately amorphous, as may be determined, for example, by x-ray diffraction analysis of the powder. Glasses may be characterized by a random structure with no long-range (crystalline) order. Finely powdered glass powders are sometimes referred to as glass frits or fillers.

Glass powders are generally produced by conventional glass making techniques. The glasses are prepared by weighing and then mixing the desired ingredients into a furnace to form a molten mixture using platinum alloy crucibles. As is well known in the art, heating is conducted to a peak temperature from 1000° C. to 1500° C. or higher and for a time such that the melt becomes entirely liquid and homogenous. The molten glass is quenched quickly and then milled to the desired particle size.

Glasses, as defined in the present invention, are generally defined as solid inorganic materials lacking long range order. Glasses are also sometimes described as amorphous solids or structures. Therefore, glasses generally lack any well-defined crystalline diffraction peaks when subjected to x-ray diffraction analysis. Fused quartz (also called fused silica) is an example of an amorphous (glass) material which is commonly used as the material of construction of reactor tubes, both at ambient conditions and at more extreme conditions of high temperature.

EXAMPLES

Example

Preparation of Glass Precursor Solution

The glass precursor solution was made through the following steps: Solution #1. 602 grams bismuth hydroxide $Bi(OH)_3$ was added to 1745.6 grams nitric acid (68-70% $HNO_3$) to dissolve. 2.5-2.8 kilograms of de-ionized water was slowly added with stirring and the solution was heated to 70° C. and maintained for 2 hours. The following powders were weighed into another container: 11.34 gms. cerium nitrate ($Ce(NO_3)_3$—$6H_2O$), 4.74 gms. aluminum nitrate (Al$(NO_3)_3$—$9H_2O$), 29.60 gms. lithium nitrate ($LiNO_3$), and 142.6 gms. boric acid ($H_3BO_3$). These powders were slowly added to 500 ml water and then this slurry was added to Solution #1. The container containing the slurry was rinsed several times with de-ionized water to transfer all material to Solution #1. 7.75 grams of colloidal silica ($SiO_2$) was added this to the solution with stirring. 4.14 grams sodium hydroxide (NaOH) was slowly dissolved in 500 ml de-ionized water in a separate container. The dissolved sodium hydroxide solution was added to the solution containing the colloidal silica. The resulting solution was clear. De-ioinized water was added to the above solution, and the final total weight was 8023 grams.

Examples 1-8 (Coupons) and Examples 9-15 (Tubes)

The above precursor solution was used to conduct the various tests, as shown in Examples 1-15.

Two physical forms of the ceramics or metals were used: (1) coupons fashioned from the test materials, and (2) reactor tubes of the test materials which could actually be placed in the furnace. The coupons used were small pieces of the test material that could be placed into a tube. These coupons were placed in an Inconel reactor tube, which could be disposed of at the end of the experiment.

The test conditions used in these examples were as follows: the reactor tube dimensions were 1.0-1.5 inches (outside diameter) with a length of 18-22 inches; the precursor glass solution was made into droplets by using ultrasonic transducers to form an aerosol with air; air was used as the carrier gas; This aerosol flowed into the reactor tube at a rate of 1.25 liters/minute; the reactor tube was in a furnace which was heated to 1000° C. Both the coupons and the reactor tubes were exposed to the aerosol at 1000° C. The abilities of the coupons and reaction tubes to resist corrosion, and be used in the formation of aerosolized glass particles, were analyzed.

Coupons tests for Examples 1, 2, 4, and 5 failed due to unacceptable corrosion by the reaction precursor during the time of the test, as evidenced by either obvious destruction of the coupon or severe penetration of the coupon material upon more extensive analysis of the coupon. Examples 3, 6 and 7 showed the formation of a glaze, which became stable after a few days in the reaction chamber and did not show signs of further change even after extended exposure to the test conditions. Example 8 (platinum) showed no obvious degradation on first examination, but more careful analysis after extended exposure to the test conditions showed bismuth penetration of the platinum, indicating that failure would likely occur after longer term exposures.

Reactor tube tests for Examples 9-13 showed unacceptable degradation of the reactor tube material after extended times in the precursor environment at process conditions. Generally failure of these reactor tube materials was evidenced by discoloration, pitting or other obvious loss of material, swelling or fracture during the test.

Examples 14 and 15 showed only the formation of a glaze material on the inner surface of the reactor tube during the test, with no further change after a few days in the test environment. The glaze material which formed in situ during the test acted as a barrier to further degradation during longer term exposures to the test environment. These tubes were found to be corrosion resistant and acceptable.

Table Of Examples For Materials Tested

| Material Tested | Form | Time To End Of Test, hrs | Example Number | Conditions At End Of Test |
|---|---|---|---|---|
| Al2O3 | Coupon | 281 | 1 | Coupon discolored and was pitted |
| W—Mo | Coupon | 76 | 2 | Coupon Corroded |
| SiN | Coupon | 280 | 3 | Glaze formed on Coupon |
| Ta—Fe | Coupon | 281 | 4 | Coupon swelled and corroded |
| Yttrium Zirconium Titanate | Coupon | 80 | 5 | Coupon swelled, cracked and changed color |
| SiC (as Hexoloy ®) | Coupon | 280 | 6 | Glaze Formed On Coupon |
| Reaction Bonded SiC | Coupon | 1693 | 7 | Glazed Formed on Coupon |
| Pt | Coupon | 270 | 8 | No obvious corrosion |
| Alumina | Tube | 342 | 9 | Tube discolored and pitted |
| Mulite | Tube | 112-193 | 10 | Tube Fracture |
| Quartz | Tube | 67-72 | 11 | Tube Fracture |
| Inconel ® 600 | Tube | 288 | 12 | Tube Leak |
| Inconel ® alonized | Tube | 336 | 13 | Tube Leak |
| SiC (as Hexoloy ®) | Tube | 1693 | 14 | Test Terminated For Analysis; stable glaze formed |
| Reaction Bonded SC | Tube | 751 | 15 | Test Terminated For Analysis |

Note:
Hexoloy ® Silicon Carbide (SiC) is a registered trade mark of the St. Gobain Corporation for alpha-sintered silicon carbide.

Using the conditions described for the testing of the coupons and the reactor tubes, the aerosol that flowed through the reactor tube was converted into a glass powder. This glass powder was a high bismuth powder. The weight % of oxides in the formed glass powders were as follows: 84.00% $Bi_2O_3$, 1.20% $SiO_2$, 0.10% $Al_2O_3$, 12.50% $B_2O_3$, 0.05% $Na_2O$, 1.00% $Li_2O$, 0.70% $CeO_2$.

In an embodiment, the glass particles have spherical morphology, small average particle size and a narrow particle size distribution. In an embodiment, the glass powders are substantially unagglomerated and have a high purity. Although the average size of the particles will vary according to the particular application of the powder, the weight average particle size of the particles may be at least about 0.05 μm in an embodiment; in a further embodiment, at least about 0.1 μm; and in a further embodiment, at least about 0.3 μm. Further, in an aspect of this embodiment, the average particle size may be not greater than about 10 μm. In a further aspect, the weight average particle size is not greater than about 5 μm and particularly not greater than 3 μm. According to an embodiment of the present invention, the powder batch of glass particles has a narrow particle size distribution, such that the majority of the glass particles has a narrow particle size distribution such that the majority of the glass particles are about the same size. In an aspect of this embodiment, at least about 80 weight percent, and in a further embodiment at least about 90 weight percent are not larger than twice the weight average particle size. The glass particles produced according to the present invention also have a high degree of purity and the particles may not include greater than about 0.1 atomic percent impurities and, in an embodiment, not greater than about 0.01 atomic percent impurities. According to one embodiment of the present invention, the glass particles are dense (e.g. not hollow or porous). According to this embodiment, the glass particles have a particle density (as measured by helium pycnometry) of at least about 80% of the theoretical value and more preferably at least about 90% of the theoretical value. The glass particles according to an embodiment of the present invention are also substantially spherical in shape. That is, the particles are not jagged or irregular in shape. In addition, the glass powders have a low surface area.

The particles are substantially spherical, which reduces the total surface area for given mass of powder. In an embodiment, the glass powders have a surface area that is close, such as within about 5 percent, of the calculated geometric surface area which is calculated for monodispersed spheres having the same average particle size.

The formed glass powders contained spherical particles with a low surface area of 0.9 meters squared per gram (as measured using the single point BET method using Flowsorb II, Model 2300 by Micromeritics) and a narrow particle size distribution (as measured using a Microtrac® X100 machine by Leeds and Northrup) of d10 0.53 microns, d50 of 0.92 microns, d90 of 1.8 microns, and a d95 of 2.6 microns.

Comparative Example 1

Quartz Tube

As a comparative example, a tube made from quartz was tested as described in the table. Failure modes of the tube included weakening and eventual breakage of the tube from the reactive loss of the tube materials and failure upon heating or cooling when compounds were formed that had a thermal expansion that is significantly different from the tube material.

Comparative Example 2

Alumina Tube

As another comparative example, an alumina tube was tested as described in the table. Failure modes of the tube included discoloration and pitting (alumina removed from areas inside the tube.

What is claimed is:
1. A coated silicon reactor tube comprising a coating on the inside of the reactor tube, wherein the coating comprises a silicon dioxide layer and a bismuth silicate layer, wherein the coated reactor tube is resistant to corrosion by bismuth containing, and bismuth and alkali containing compounds at elevated temperature (>700° C.) in an oxidizing environment, wherein the tube comprises one or more materials selected from the group consisting of ceramic and glass,
wherein the tube comprising ceramic material comprises one or more materials selected from the group consisting of: silicon carbide, reaction bonded silicon carbide, alpha-sintered silicon carbide and silicon nitride.

2. The coated tube of claim 1, wherein the silicon dioxide layer comprises one or more crystalline forms selected from the group consisting of: cristoballite, quartz and tridymite.

3. The coated tube of claim 1, wherein the bismuth silicate layer comprises one or more components selected from the group consisting of: crystalline $Bi_4Si_3O_{12}$ and an amorphous material comprising $Bi_2O_3$ and $SiO_2$.

4. The coated tube of claim 3, wherein the amorphous material comprises $2Bi_2O_3.3SiO_2$.

5. The coated tube of claim 1, wherein the coated silicon tube consists of silicon carbide or silicon nitride.

* * * * *